United States Patent
Zhang et al.

(10) Patent No.: US 10,391,878 B2
(45) Date of Patent: Aug. 27, 2019

(54) SYSTEM AND METHOD FOR CALIBRATING BATTERY STATE OF CHARGE

(71) Applicant: General Electric Company, Schenectady, NY (US)

(72) Inventors: Jiucai Zhang, Arvada, CO (US); Charles Clarence Hicks, Jr., Loundonville, NY (US); Sam T. Liu, Niskayuna, NY (US); Robert A. Kaucic, Niskayuna, NY (US); Leng Mao, Latham, NY (US)

(73) Assignee: General Electric Company, Schenectady, NY (US)

( * ) Notice: Subject to any disclaimer, the term of this patent is extended or adjusted under 35 U.S.C. 154(b) by 1153 days.

(21) Appl. No.: 14/510,306

(22) Filed: Oct. 9, 2014

(65) Prior Publication Data
US 2016/0101708 A1    Apr. 14, 2016

(51) Int. Cl.
| | |
|---|---|
| *B60L 11/18* | (2006.01) |
| *H02J 7/00* | (2006.01) |
| *H02J 7/14* | (2006.01) |
| *B60L 53/00* | (2019.01) |
| *B60L 58/12* | (2019.01) |

(52) U.S. Cl.
CPC ........... *B60L 11/1861* (2013.01); *B60L 53/00* (2019.02); *B60L 58/12* (2019.02); *H02J 7/0021* (2013.01); *H02J 7/1461* (2013.01); *Y02T 10/7005* (2013.01); *Y02T 10/705* (2013.01); *Y02T 10/7044* (2013.01); *Y02T 10/7072* (2013.01); *Y02T 90/14* (2013.01)

(58) Field of Classification Search
CPC .............. B60L 11/1861; B60L 11/1862; B60L 11/1864; B60L 11/1866
USPC ........................................................ 320/128
See application file for complete search history.

(56) References Cited

U.S. PATENT DOCUMENTS

| | | | |
|---|---|---|---|
| 5,596,260 | A  | 1/1997  | Moravec et al. |
| 6,356,083 | B1 | 3/2002  | Ying |
| 6,424,157 | B1 | 7/2002  | Gollomp et al. |
| 6,646,419 | B1 | 11/2003 | Ying |
| 7,834,582 | B2 | 11/2010 | Luan et al. |
| 8,374,807 | B2 | 2/2013  | Hall |
| 8,614,563 | B2 | 12/2013 | Baughman |

(Continued)

FOREIGN PATENT DOCUMENTS

JP    WO 2014147475 A2 * 9/2014 .......... B60L 11/1861

*Primary Examiner* — Olatunji A Godo
(74) *Attorney, Agent, or Firm* — Dority & Manning, P.A.

(57) ABSTRACT

The present disclosure is directed to a system and method for calibrating state-of-charge (SOC) of an energy storage device. The method includes monitoring, via a battery management system, at least one of an accumulated capacity of the energy storage device after a first SOC calibration or a time period after the first SOC calibration. Another step includes determining, via the battery management system, whether at least one of the accumulated capacity or the time period is above a predetermined threshold. If at least one of the accumulated capacity or the time period is above a predetermined threshold, then the method includes charging, via the battery management system, the energy storage device for a specified duration until the energy storage device reaches a second SOC calibration.

12 Claims, 4 Drawing Sheets

(56) References Cited

U.S. PATENT DOCUMENTS

| | | | |
|---|---|---|---|
| 2005/0040789 A1* | 2/2005 | Salasoo | H02J 7/0014 |
| | | | 320/119 |
| 2011/0226559 A1 | 9/2011 | Chen et al. | |
| 2013/0317697 A1* | 11/2013 | Hotta | G01R 31/3651 |
| | | | 701/34.4 |
| 2014/0239964 A1* | 8/2014 | Gach | H02J 7/0021 |
| | | | 324/433 |
| 2016/0049821 A1* | 2/2016 | Aridome | B60L 11/1861 |
| | | | 320/128 |

* cited by examiner

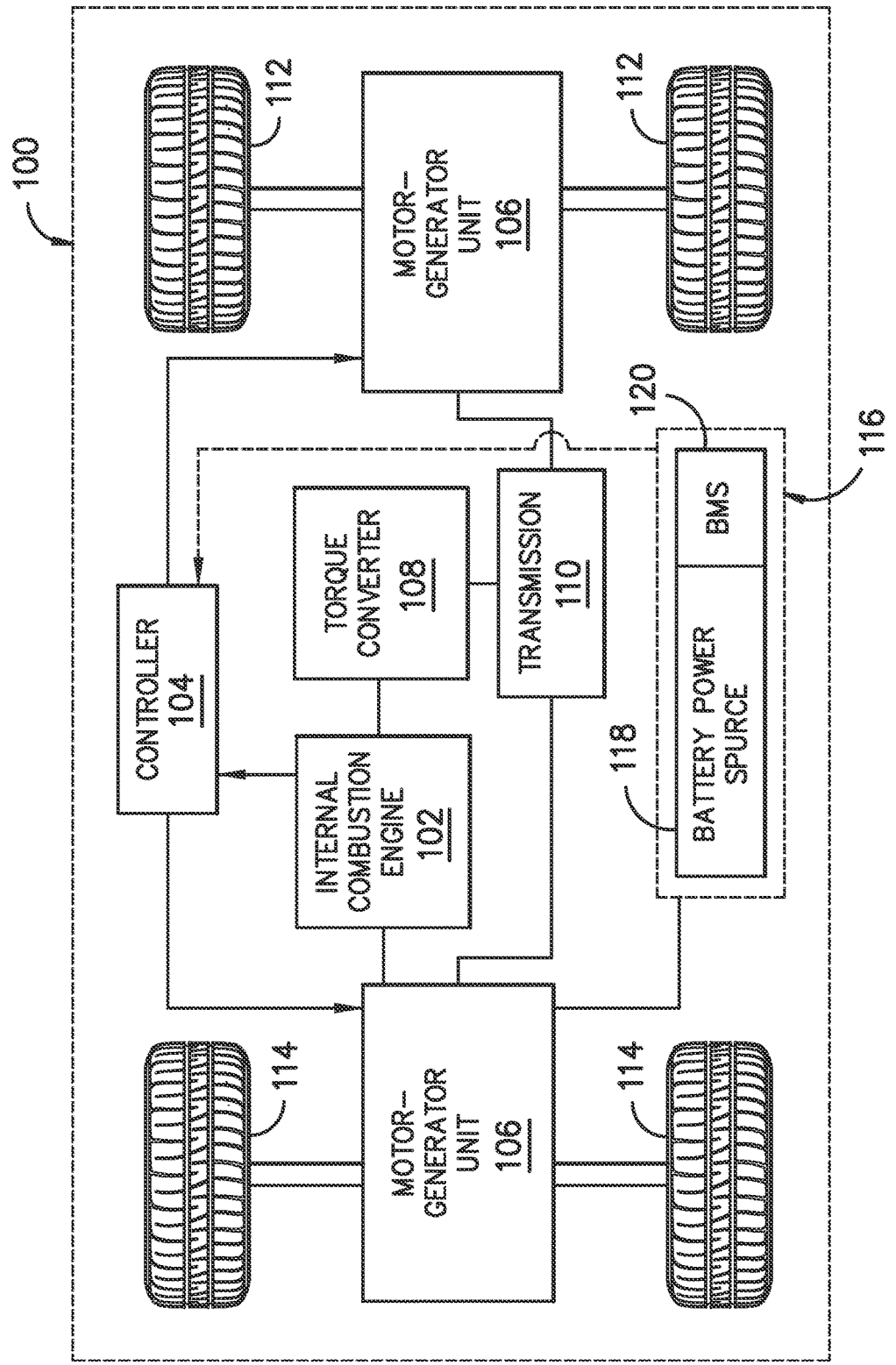
FIG. -1-

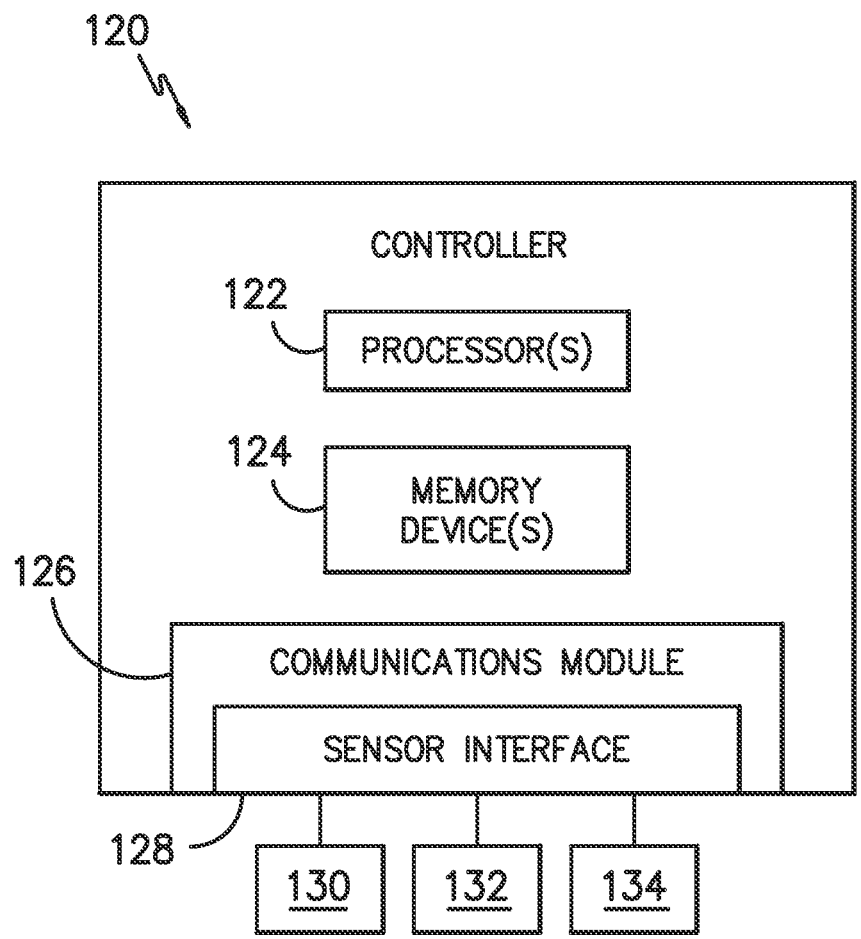
FIG. -2-

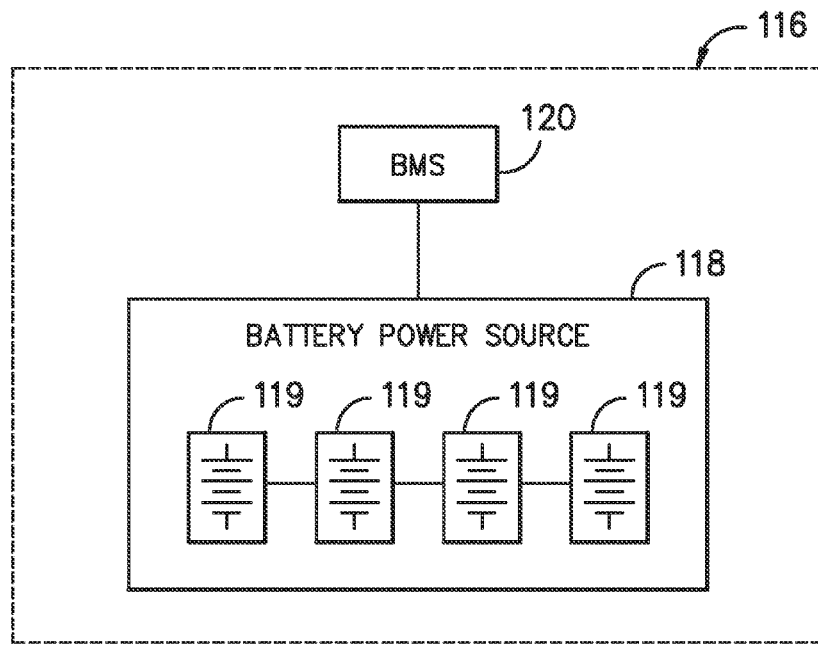
FIG. -3-
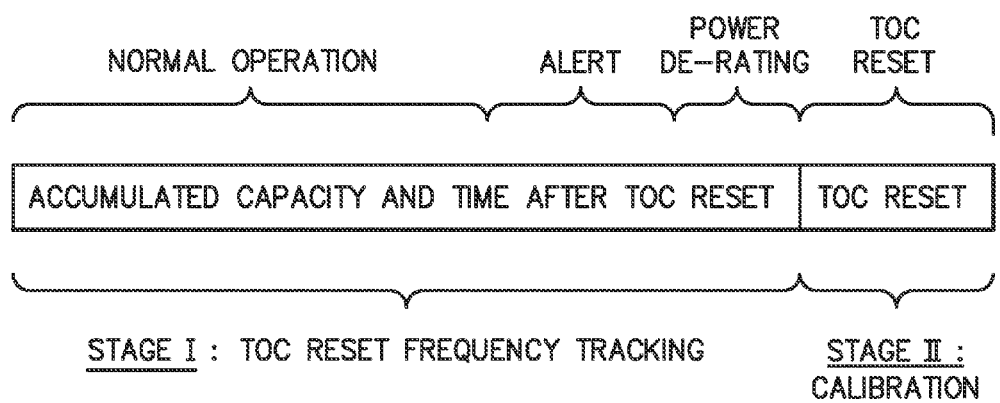
FIG. -4-

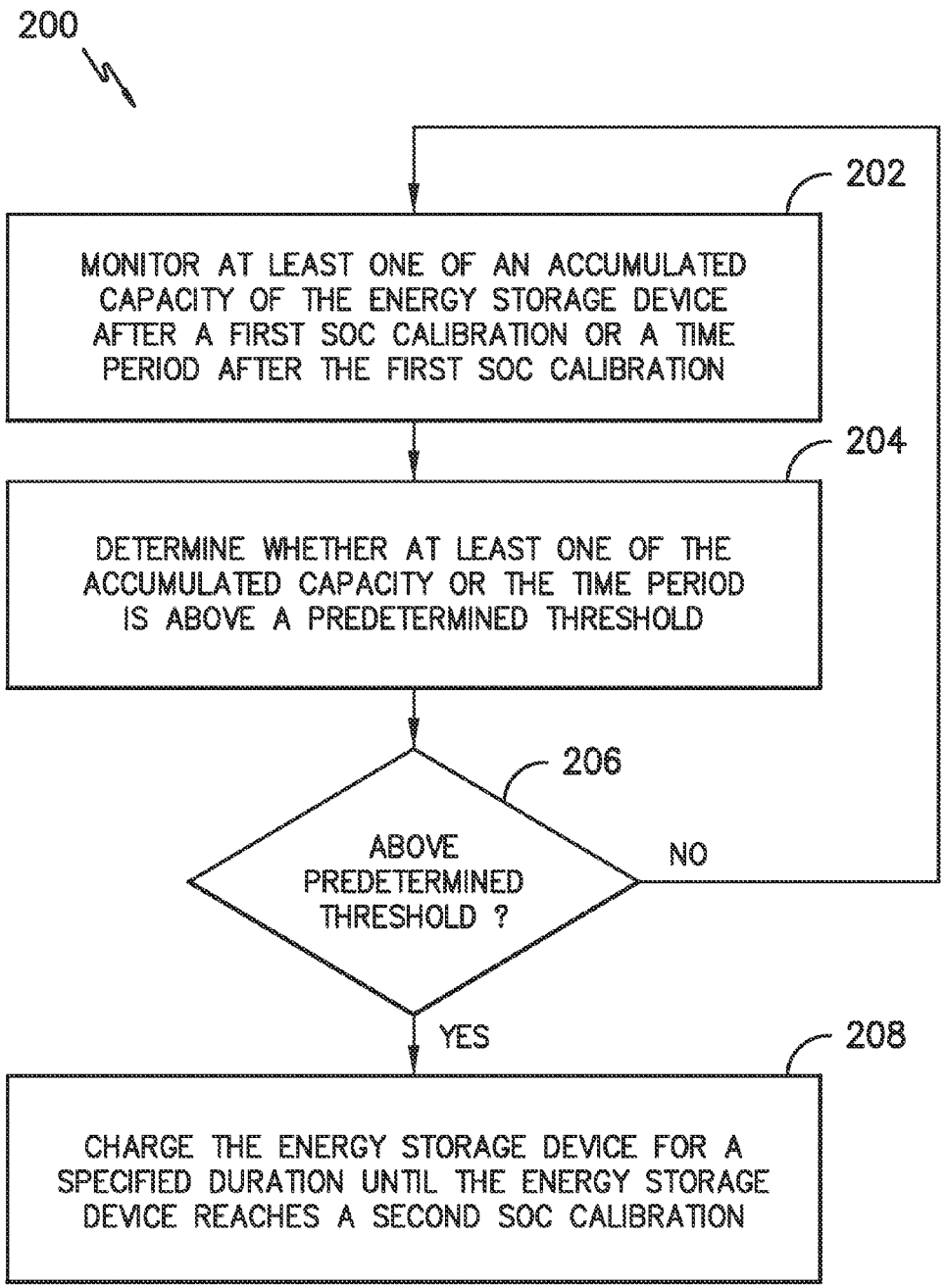
FIG. -5-

SYSTEM AND METHOD FOR CALIBRATING BATTERY STATE OF CHARGE

FIELD OF THE INVENTION

The present subject matter relates generally to battery power sources and, more particularly, to systems and methods for calibrating a state-of-charge of a battery power source.

BACKGROUND OF THE INVENTION

Battery packs containing one or more batteries are used in many applications. For example, electric or hybrid electric vehicles are typically powered by one or more battery packs. As a battery pack is used and the batteries therein age, the batteries may need to be balanced with respect to their states of charge. The state of charge (SOC) of a battery, as used herein, is generally defined as the percentage of the full capacity of a battery that is still available for further discharge. Thus, the SOC of a battery may be used to regulate charging and discharging of the battery. Thus, it may be beneficial to track or monitor the SOC of one or more batteries during operation. Current techniques for tracking battery state of charge may include a coulomb-counting method that generates a coulomb count of the charge going into and out of the battery. Due to the accumulation of error in current measurements and step time, however, the accuracy of the coulomb-counting method may decrease over time.

Further, technologies for monitoring battery SOC include using a fixed maximum capacity value and runtime counter of the capacity consumed by the battery to determine a percentage of charge calculation based on charge units. This count, however, is often inaccurate due to cumulative errors in runtime readings, battery condition, variance of actual maximums, partial charges, and/or batteries charged externally.

In view of the aforementioned issues, it is desirable to provide a system and method for calibrating battery SOC so as to eliminate cumulative errors. Thus, the present disclosure is directed to a system and method for calibrating a battery state of charge by tracking accumulated capacity and/or time after a SOC calibration of the battery and initiating a SOC calibration when the accumulated capacity or time is beyond a predetermined threshold.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a method for calibrating state-of-charge (SOC) of an energy storage device is disclosed. The method includes monitoring, via a battery management system, at least one of an accumulated capacity of the energy storage device after a first SOC calibration or a time period after the first SOC calibration. Another step includes determining, via the battery management system, whether the accumulated capacity or the time period is above a predetermined threshold. If either the accumulated capacity or the time period is above the predetermined threshold, then the method includes charging, via the battery management system, the energy storage device for a specified duration until the energy storage device reaches a second SOC calibration.

In one embodiment, the first SOC calibration includes a top-of-charge (TOC) reset and the second calibration includes a subsequent TOC reset. More specifically, in several embodiments, the TOC reset includes setting the SOC of the energy storage device to 100% full capacity during recharge when a certain battery condition is reached. In certain embodiments, the battery condition may include at least one of a current, a resistance, a voltage, or any other suitable condition of the energy storage device.

In further embodiments, the method further includes monitoring the accumulated capacity by monitoring a total ampere-hours discharged by the energy storage device after the first SOC calibration. In another embodiment, the method includes monitoring the time period after the first SOC calibration via one or more sensors. In certain embodiments, the one or more sensors configured to monitor the time period may include at least one of a clock, a timer, a counter, or similar.

In still further embodiments, the predetermined threshold may include a value that is greater than at least one of a rated capacity of the energy storage device or a time value that is indicative of a failure of the energy storage device to reach a SOC calibration. In additional embodiments, the SOC of the energy storage device may be based on a percentage of a full capacity of the energy storage device that is available for discharge. In particular embodiments, the energy storage device may be at least one of a lithium ion battery, a sodium nickel chloride battery, a sodium sulfur battery, a nickel metal hydride battery, a nickel cadmium battery, a fuel cell, or similar. In additional embodiments, the energy storage device and/or the battery management system may be components within an electric vehicle, an electronic device, a telecommunications facility, or any other suitable application.

In another aspect, the present disclosure is directed to a system for calibrating state-of-charge (SOC) of an energy storage device. The system includes one or more sensors configured to monitor at least one of an accumulated capacity of the energy storage device after a first SOC calibration or a time period after the first SOC calibration. In addition, the system includes a controller configured to perform one or more operations. In various embodiments, the one or more operations include determining whether at least one of the accumulated capacity or the time period is above a predetermined threshold and if at least one of the accumulated capacity or the time period is above the predetermined threshold, charging the energy storage device for a specified duration until the energy storage device reaches a second SOC calibration. It should be understood that the system may include any of the additional features as described herein.

In yet another aspect, the present disclosure is directed to a battery management system for an electric vehicle. The battery management system includes a controller configured to perform one or more operations so as to calibrate a state-of-charge (SOC) of a battery. The operations include, at least, determining whether at least one of an accumulated capacity of the battery after a first top-of-charge (TOC) reset or the time period after the first TOC reset is above a predetermined threshold. If at least one of the accumulated capacity or the time period is above the predetermined threshold, another operation includes charging the battery for a specified duration until the battery reaches a second top-of-charge (TOC) reset. It should be understood that the battery management system may include any of the additional features as described herein.

In one embodiment, the battery management system may include one or more sensors configured to monitor a total ampere-hours discharged by the battery after the first TOC reset so as to determine the accumulated capacity and/or the time period after the first TOC reset.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a block diagram of one embodiment of a hybrid electric vehicle according to the present disclosure;

FIG. 2 illustrates a block diagram of one embodiment of a battery management system according to the present disclosure;

FIG. 3 illustrates a block diagram of one embodiment of an electric energy storage system according to the present disclosure;

FIG. 4 illustrates a block diagram of one embodiment of the framework for SOC calibration according to the present disclosure; and FIG. 5 illustrates a flow diagram of one embodiment of a method for calibrating battery SOC according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for calibrating a battery state-of-charge. For example, in one embodiment, the system (e.g. the battery management system) monitors an accumulated capacity of the battery after a SOC calibration, e.g. a top-of-charge (TOC) reset, and/or a predetermined time period after the SOC calibration. If the monitored accumulated capacity and/or the predetermined time period are beyond a specific threshold, then the system is configured to recharge the battery for a certain duration sufficient for the battery to reach a SOC calibration. Thus, the accumulated capacity and time period will be reset to zero and the process can be repeated. In certain embodiments, the battery management system (BMS) may send an alert message to the system controller for reminding a user to allow the battery to recharge for the certain duration such that SOC calibration may occur.

The present disclosure provides many advantages not present in the prior art. For example, the accuracy of the battery SOC can be controlled within an expected range. Thus, a battery fuel gauge can be more accurately determined. In addition, the improved SOC accuracy extends battery life and warranty.

Referring now to the drawings, FIG. 1 illustrates a block diagram of an exemplary hybrid electric vehicle 100 having a SOC calibration system according to one embodiment of the present disclosure. As shown, the electric vehicle 100 includes a powertrain system having an internal combustion engine 102, a powertrain controller 104, and one or more motor-generator units 106. T'55 n f5dt4he internal combustion engine 102 provides motive power to drive wheels 112, 114 using known power transmission devices including, for example, a torque converter 108 and a transmission 110. The motor-generator unit 106 is operable to spin the internal combustion engine 102 to start engine operation. It should be understood that the embodiment of FIG. 1 is provided for illustrative purposes only and is not intended to limit the system and method of the present disclosure to electric vehicles. Rather, the system and method of the present disclosure can be used in any suitable application, including, but not limited to electric vehicles, electronic devices, telecommunications facilities, and/or any other suitable application.

Still referring to FIG. 2, the motor-generator unit 106 is configured to charge an electrical energy storage system 116. As shown in FIGS. 1 and 3, for example, the energy storage system 116 includes a battery power source 118 controlled or monitored by a battery management system ("BMS") 120. The BMS 120, as referred to herein, generally refers to any electronic system that manages the battery power source 118. Thus, in several embodiments, the BMS 120 is configured to monitor and/or control operation of the battery power source 118. More specifically, the BMS 120 may be configured to protect the battery power source 118 from operating outside of safe operation, monitor their state, calculate and report data, control the battery environment, and/or any other suitable control actions needed for battery protection. In certain embodiments, the battery power source 118 may include one or more energy storage devices 119 or batteries. More specifically, in particular embodiments, the energy storage device(s) 119 may include at least one of a lithium ion battery, a sodium nickel chloride battery, a sodium sulfur battery, a nickel metal hydride battery, a nickel cadmium battery, a fuel cell, or similar. Thus, the BMS 120 is configured to monitor and/or control operation of the individual energy storage devices 119.

Referring now to FIG. 2, there is illustrated a block diagram of one embodiment of suitable components that may be included within the BMS 120 and/or the controller 104 in accordance with aspects of the present subject matter. As shown, the BMS 120 may include one or more processor(s) 122 and associated memory device(s) 124 configured to perform a variety of computer-implemented functions (e.g., performing the methods, steps, calculations and the like and storing relevant data as disclosed herein). This includes monitoring conditions of the batteries 119 and/or determining a state of charge of one or more of the batteries 119. Additionally, the BMS 120 may also include a communications module 126 to facilitate communications between the BMS 120 and the various components of the electric vehicle 100. Further, the communications module 126 may include a sensor interface 128 (e.g., one or more analog-to-digital converters) to permit signals transmitted from the sensors 130, 132, 134 to be converted into signals that can be understood and processed by the processors 122. It should be appreciated that the sensors 130, 132, 134 may be communicatively coupled to the communications module 126 using any suitable means. For example, as shown, the sensors 130, 132, 134 are coupled to the sensor interface 128 via a wired connection. However, in other embodiments, the sensors 130, 132, 134 may be coupled to the sensor interface 128 via a wireless connection, such as by using any suitable wireless communications protocol known in the art.

Control algorithms in the BMS 120 are stored in the memory devices 124 and executed by the processors 122. As mentioned, one such algorithm executed by the BMS 120 includes calibrating SOC for the one or more batteries 119. The SOC of the battery as described herein is essentially equal to a fuel gauge of the battery power source 118 in the hybrid electric vehicle 100. Thus, the SOC of the battery power source 118 describes the current state of one or more of the batteries 119 in use. Further, the units of SOC are typically represented as a percentage of a full capacity of the battery that is available for discharge.

Thus, as shown in FIG. 4, the BMS 120 monitors accumulated capacity of the battery power source 118 after a SOC calibration, a time period after the SOC calibration, or both (Stage I). More specifically, as shown in the illustrated embodiment, the SOC calibration occurs when a TOC reset occurs. The TOC reset as described herein refers to setting the SOC to 100% during recharge when a certain battery condition is reached. In certain embodiments, for example, the battery condition may include at least one of a current, a resistance, a voltage, or any other suitable battery condition. In addition, the accumulated capacity of the battery may be determined by monitoring a total ampere-hours discharged by the battery after a SOC calibration, e.g. a TOC reset. In addition, the time period after the SOC calibration may be monitored via one or more sensors. For example, in certain embodiments, the sensors may include a clock, a timer, a counter, or similar.

The BMS 120 can then determine whether the accumulated capacity or the time period is above a predetermined threshold. In certain embodiments, the predetermined threshold may include a value that is greater than a rated capacity of the battery. In additional embodiments, the predetermined threshold may be a time value that indicates the battery has failed to reach a SOC calibration. More specifically, in several embodiments, the time value or initial time threshold may be determined as a function of the required SOC accuracy and/or current sensing error. For example, the initial time threshold may be determined based on the following formula:

$$\text{Initial Time Threshold} = \text{Required SOC Accuracy} \cdot (\text{Battery Capacity}/\text{Current Sensing Error})$$

In addition, the initial accumulated capacity threshold can be estimated by measuring the SOC change before and after SOC calibration. For example, the initial accumulated capacity threshold may be determined based on the following formula:

$$\text{Initial Accumulated Capacity} = z \cdot \text{Required SOC Accuracy}/(y-x),$$

where
x is the SOC before SOC calibration,
y is the SOC after SOC calibration, and
z is the accumulated capacity between the two SOC calibrations.

The accumulated capacity and the time period may also be adaptively updated based on the SOC change before and after SOC calibration. That is, if the SOC change before and after SOC calibration is less than the required SOC accuracy, then the predetermined threshold can be increased with delta capacity or time. Alternatively, the predetermined threshold can be decreased with delta capacity or time.

Furthermore, the current sensing error can be adaptively zeroed by adding the measured current within a calibration sensing error. More specifically, in one embodiment, the calibration sensing error may be determined based on the following formula:

$$I_{err} = (y-x) \cdot (\text{Full Capacity})/\Delta t$$

where
y is the SOC before SOC calibration,
x is the SOC after SOC calibration, and
$\Delta t$ is the total time between the two SOC calibrations.

In particular embodiments, the full capacity of the battery can be updated if the two different SOC calibrations occur when the accumulated SOC error is less than a predetermined accuracy, e.g. one tenth of the SOC accuracy. That is, the full capacity can be measured as follows:

$$\text{Full Capacity} = (z + I_{err} \cdot t)/(m-n)$$

where
$I_{err}$ is the calibration sensing error,
z is the accumulated capacity between the two SOC calibrations,
n denotes the SOC at the first calibration,
m denotes the SOC at the second calibration, and m and n are different.

Referring still to FIG. 4, if either or both the accumulated capacity or the time period for a particular battery 119 is above the predetermined threshold, then the BMS 120 is configured to charge the battery 119 for a specified duration until the battery 119 reaches another SOC calibration. For example, during Stage I, the BMS 120 is configured to track the accumulated capacity and time period (i.e. Normal Operation), remind a user to recharge the battery longer (i.e. Alert), and schedule a SOC calibration. More specifically, if either the accumulated capacity or the time period since a previous SOC calibration is beyond a warning threshold, then the BMS 120 is configured to send an alert message to the controller 104 for reminding the user to allow the battery to recharge longer such that a SOC calibration, e.g. a TOC reset, may occur.

If a SOC calibration does not occur during the monitored time period, then the BMS 120 is configured to request the controller 104 to de-rate battery power capability when the accumulated capacity. At Stage II, the BMS 120 can then schedule a recharge duration for the battery 119 that is long enough to reach SOC calibration. Accordingly, the accumulated capacity and time period will be reset to zero. As such, the systems and methods for SOC calibration according to the present disclosure are simple and adaptive by tracking accumulated capacity and time after SOC calibration.

Referring now to FIG. 5, a flow diagram of a method 200 for calibrating SOC of a battery is illustrated. As shown, the method 200 includes monitoring at least one of an accumulated capacity of the battery after a first SOC calibration or a time period after the first SOC calibration (step 202). Another step 204 of the method 200 includes determining whether at least one of the accumulated capacity or the time period is above a predetermined threshold. If both the accumulated capacity and the time period is below a predetermined threshold (step 206), the method 200 continues to monitor according to step 202. If at least one of the accumulated capacity or the time period is above a predetermined threshold (step 206), the method 200 includes charging, via the battery management system, the battery for a specified duration until the battery reaches a second SOC calibration reset (step 208).

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for calibrating state-of-charge (SOC) of an energy storage device, the method comprising:
    monitoring, via a battery management system, an accumulated capacity of the energy storage device after each top-of-charge (TOC) reset and a time period after each TOC reset, each TOC reset comprising the SOC of the energy storage device being equal to 100% full capacity during recharge when a certain battery condition is reached, the battery condition comprising at least one of a current, a resistance, or a voltage of the energy storage device;
    determining, via the battery management system, whether the accumulated capacity or the time period after each TOC reset is above a predetermined threshold; and
    if at least one of the accumulated capacity or the time period after each TOC reset is above a predetermined threshold, charging, via the battery management system, the energy storage device for a specified duration until the energy storage device reaches another TOC reset.

2. The method of claim 1, further comprising monitoring the accumulated capacity by monitoring a total ampere-hours discharged by the energy storage device.

3. The method of claim 1, further comprising monitoring the time period after each TOC reset via one or more sensors, wherein the one or more sensors comprise at least one of a clock, a timer, or a counter.

4. The method of claim 1, wherein the predetermined threshold comprises a value greater than at least one of a rated capacity of the energy storage device or a time value that is indicative of a failure of the energy storage device to reach the TOC reset.

5. The method of claim 1, wherein the SOC of the energy storage device comprises a percentage of a full capacity of the energy storage device that is available for discharge.

6. The method of claim 1, wherein the energy storage device comprises at least one of a lithium ion battery, a sodium nickel chloride battery, a sodium sulfur battery, a nickel metal hydride battery, a nickel cadmium battery, or a fuel cell.

7. The method of claim 1, wherein the energy storage device and the battery management system are components of an electric vehicle.

8. A system for calibrating state-of-charge (SOC) of an energy storage device, the system comprising:
    one or more sensors configured to monitor an accumulated capacity of the energy storage device after a first each top-of-charge (TOC) reset and a time period after the first TOC reset, the first TOC reset comprising the SOC of the energy storage device being equal to 100% full capacity during recharge when a certain battery condition is reached, the battery condition comprising at least one of a current, a resistance, or a voltage of the energy storage device; and
    a controller configured to perform one or more operations, the one or more operations comprising:
        determining whether the accumulated capacity or the time period after the first TOC reset is above a predetermined threshold; and
        if at least one of the accumulated capacity or the time period after the first TOC reset is above the predetermined threshold, charging the energy storage device for a specified duration until the energy storage device reaches a second TOC reset.

9. The system of claim 8, wherein the accumulated capacity is based on a total ampere-hours discharged by the energy storage device.

10. The system of claim 8, further comprising monitoring the time period after the first TOC reset via one or more sensors, wherein the one or more sensors comprise at least one of a clock, a timer, or a counter.

11. The system of claim 8, wherein the predetermined threshold comprises a value greater than at least one of a rated capacity of the energy storage device or a time value that is indicative of a failure of the energy storage device to reach the first TOC reset.

12. The system of claim 8, wherein the energy storage device comprises at least one of a lithium ion battery, a sodium nickel chloride battery, a sodium sulfur battery, a nickel metal hydride battery, a nickel cadmium battery, or a fuel cell.

* * * * *